(12) United States Patent
Nishiwaki et al.

(10) Patent No.: US 12,071,112 B2
(45) Date of Patent: Aug. 27, 2024

(54) ELECTRIC-BRAKE CONTROL APPARATUS

(71) Applicant: Mitsubishi Electric Corporation, Tokyo (JP)

(72) Inventors: Kazuhiro Nishiwaki, Tokyo (JP); Ryo Shinohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 202 days.

(21) Appl. No.: 17/365,540

(22) Filed: Jul. 1, 2021

(65) Prior Publication Data
US 2022/0073045 A1 Mar. 10, 2022

(30) Foreign Application Priority Data
Sep. 7, 2020 (JP) ................................ 2020-149563

(51) Int. Cl.
*B60T 13/74* (2006.01)
*B60T 7/04* (2006.01)
*B60T 8/172* (2006.01)
*B60T 8/32* (2006.01)

(52) U.S. Cl.
CPC ............ *B60T 13/741* (2013.01); *B60T 7/042* (2013.01); *B60T 8/172* (2013.01); *B60T 8/3255* (2013.01)

(58) Field of Classification Search
CPC ...... B60T 13/741; B60T 8/172; B60T 8/3255; B60T 7/042
See application file for complete search history.

(56) References Cited

U.S. PATENT DOCUMENTS

| 2003/0062228 A1* | 4/2003 | Ichinose | B60T 13/741 188/72.3 |
| 2008/0029355 A1* | 2/2008 | Kawahara | B60T 8/24 188/72.1 |
| 2021/0197777 A1* | 7/2021 | Itakura | B60T 1/065 |
| 2022/0032885 A1* | 2/2022 | Yokoyama | B60T 13/662 |

FOREIGN PATENT DOCUMENTS

| JP | 2000-018294 A | 1/2000 | |
| WO | 2019/244426 A1 | 12/2019 | |
| WO | WO-2020066645 A1 * | 4/2020 | ............ B60T 13/662 |

OTHER PUBLICATIONS

Office Action issued Jun. 13, 2023 in Chinese Application No. 202110979920.2.
Chinese Office Action dated Nov. 2, 2023 in Application No. 202110979920.2.

* cited by examiner

*Primary Examiner* — Vishal R Sahni
(74) *Attorney, Agent, or Firm* — Sughrue Mion, PLLC; Richard C. Turner

(57) ABSTRACT

The objective is to suppress a delay in the response of pressing force of an electric brake, when braking and non-braking are alternately repeated in an electric-brake control apparatus. An electric-brake control amount calculation unit of an electric-brake control apparatus according to the present disclosure calculates a control amount for securing a clearance between a brake pad and a brake disk, based on a position of the brake pad, calculated by a position calculator at a non-braking time, and secures the clearance by changing the control amount in two or more separate steps at a time when the braking is switched to the non-braking. As a result, it is made possible to obtain an electric-brake control apparatus that can suppress a delay in the response of pressing force of an electric brake, when braking and non-braking are alternately repeated.

12 Claims, 14 Drawing Sheets

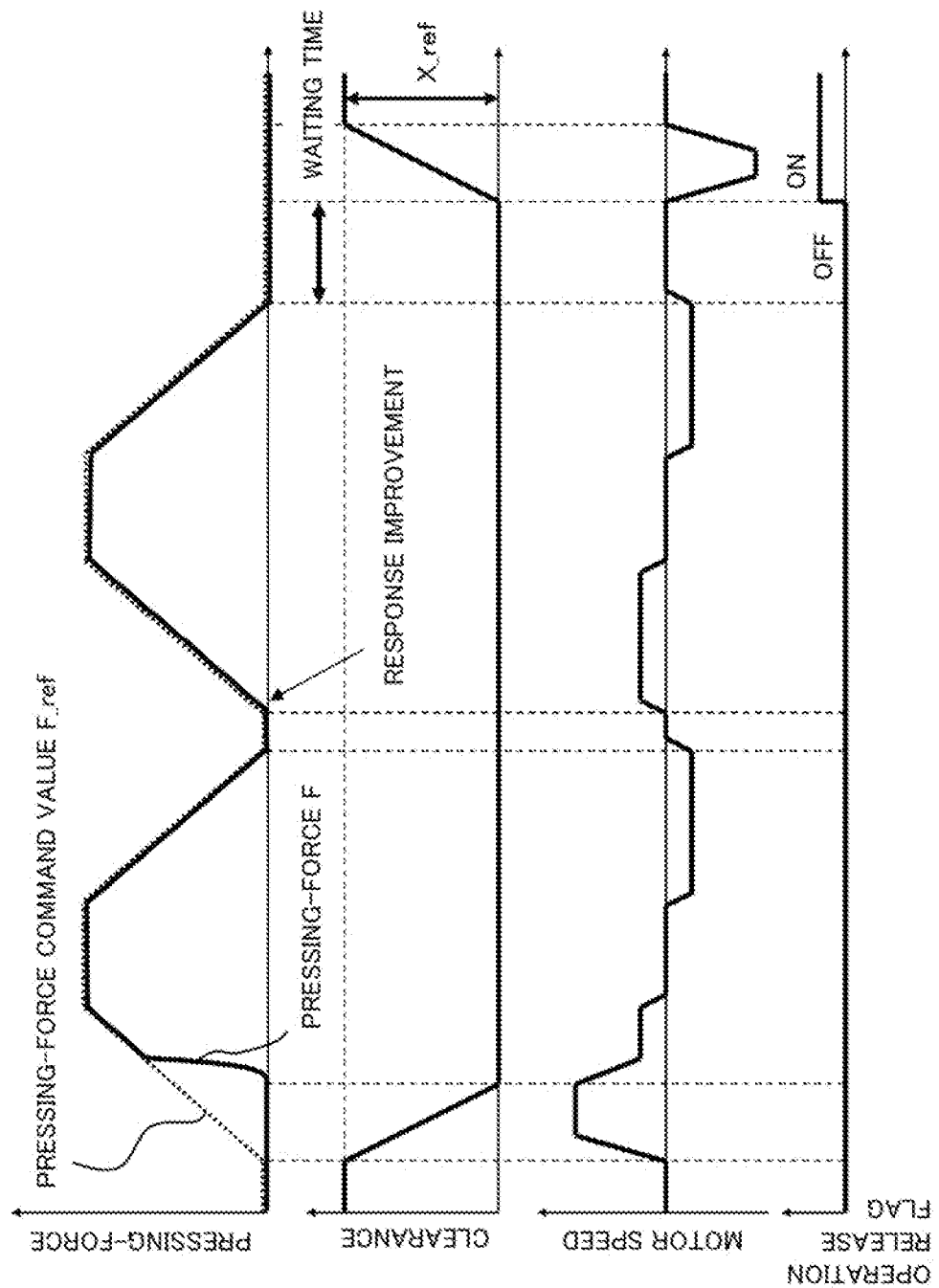

ELECTRIC-BRAKE CONTROL APPARATUS

BACKGROUND OF THE INVENTION

Field of the Invention

The present disclosure relates to an electric-brake control apparatus.

Description of the Related Art

With regard to an electric brake in which a brake pad is pressed to a brake disk by converting rotary motion of a motor into linear motion, Patent Document 1 has been disclosed. In a technology of Patent Document 1, an electric brake is made to be in a braking state, based on a pressing force command value inputted to a control apparatus. The control apparatus controls a motor in the electric brake so as to make pressing force generated between a brake pad and a brake disk coincide with the pressing force command value. In addition, in the case where the inputted pressing force command value is zero, i.e., in the case of a non-braking state, the control apparatus controls the motor so as to provide a predetermined clearance (spacing) between the brake pad and the brake disk. As a result, it is prevented by the control apparatus that at a non-braking time, the brake pad and the brake disk make contact with each other, thereby causing unnecessary friction (drag resistance) and hence deteriorating the gasoline mileage of a vehicle.

PRIOR ART REFERENCE

Patent Literature

[Patent Document 1] Japanese Patent Application Laid-Open No. 2000-018294

SUMMARY OF THE INVENTION

In the case where the pressing force command value is intermittently issued to an electric-brake control apparatus, i.e., in the case where braking and non-braking are alternately repeated, a next pressing force command value may be provided while operation of securing a clearance is performed. While the brake pad is separated from the brake disk in the operation of securing a clearance, the motor is rotating backward; thus, in the case where in accordance with the pressing force command value, the brake pad is made to approach the brake disk and is pressed thereto from that position, it is required to reverse the rotation direction of the motor to a forward rotation. Accordingly, the response of pressing force is delayed by a time corresponding to the operation of reversing the motor direction.

The objective of the present disclosure is to obtain an electric-brake control apparatus that can suppress a delay in the response of pressing force of an electric brake when braking and non-braking are alternately repeated in an electric-brake control apparatus.

An electric-brake control apparatus according to the present disclosure controls an electric brake in which a brake pad is pressed to a brake disk by converting rotary motion of a motor into linear motion; the electric-brake control apparatus includes a position calculator that calculates a position of a brake pad, an electric-brake control amount calculator that performs switching between braking and non-braking in accordance with an input signal and calculates a control amount for the electric brake, and a motor controller that controls the motor, based on the control amount; the electric-brake controller is characterized in that the electric-brake control amount calculator calculates a control amount for securing a predetermined clearance between the brake pad and the brake disk, based on a position of the brake pad, calculated by the position calculator at a non-braking time, and secures the clearance by changing the control amount in two or more separate steps at a time when the braking is switched to the non-braking.

An electric-brake control apparatus according to the present disclosure secures a clearance by changing the control amount in two or more separate steps at a time when the braking is switched to the non-braking. As a result, it is made possible to obtain an electric-brake control apparatus that can suppress a delay in the response of pressing force of an electric brake, when braking and non-braking are alternately repeated.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 16 is a second timing chart representing the operation of the electric brake apparatus according to Embodiment 2.

DETAILED DESCRIPTION OF THE PREFERRED EMBODIMENTS

1. Embodiment 1

Configuration

Figure 1:
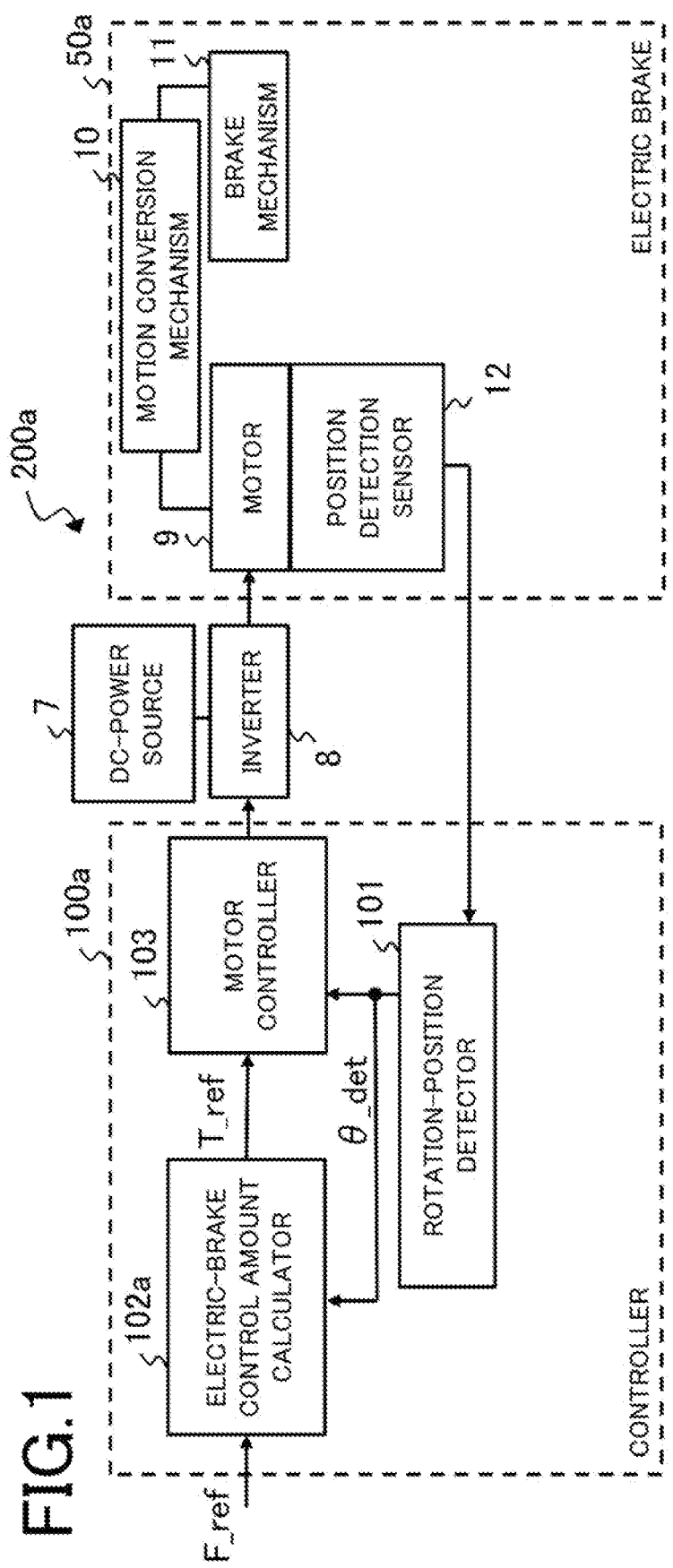
FIG. 1 is a configuration diagram of an electric brake apparatus according to Embodiment 1.

FIG. 1 is a configuration diagram of an electric brake apparatus 200a according to Embodiment 1. The electric brake apparatus 200a includes an electric brake 50a, an electric-brake control apparatus 100a, and an inverter 8. The electric-brake control apparatus 100a is referred to only as the electric-brake controller 100a or the controller 100a, hereinafter. The inverter 8 is connected with a DC power source 7 that supplies the inverter 8 with electric power. Each of the electric brake 50a and the control apparatus 100a is also supplied with electric power by the DC power source 7; however, in FIG. 1, description about the connection is omitted.

The electric brake 50a has a motor 9, a position detection sensor 12, a motion conversion mechanism. 10, and a brake mechanism 11. The motor 9 is provided with a stator and a rotor. A winding is provided in one of the stator and the rotor or in each thereof. Torque outputted from the motor 9 varies by changing a winding current flowing in the winding. The motor 9 can output torque in a first rotation direction and torque in a second rotation direction opposite to the first rotation direction and can rotate in the first rotation direction and the second rotation direction. As the motor 9, one of various kinds of motors such as a permanent-magnet synchronous motor and a DC motor.

Two or more switching devices that each turn on or off an electric current to be supplied from the DC power source 7 are provided in the inverter 8. A control signal from the controller 100a turns on or off the switching devices, so that a winding current in the motor 9 is controlled. As the switching device, a MOSFET (Metal Oxide Semiconductor Field Effect Transistor), an IGBT (Insulated Gate Bipolar Transistor), or the like is utilized.

A position detection sensor 12 that detects a rotation position (rotation angle) of the motor 9 (rotor) is provided in the motor 9. As the position detection sensor 12, a resolver, a hole device, an encoder, or the like is utilized. An output signal of the position detection sensor 12 is inputted to the controller 100a.

The brake mechanism 11 has a brake pad and a brake disk. The brake disk is fixed on a rotating member such as a vehicle wheel. The brake pad is fixed on a non-rotating member such as a vehicle body.

The motion conversion mechanism 10 converts rotary motion of the motor 9 (rotor) into linear motion. The motion conversion mechanism 10 makes the brake pad move toward the brake disk so as to press the brake pad to the brake disk. The motion conversion mechanism 10 converts torque of the motor 9 into pressing force F (unillustrated) for pressing the brake pad. Frictional force proportional to the pressing force F is produced in the brake mechanism 11. In addition, the motion conversion mechanism 10 makes the brake pad move toward the side opposite to the brake disk side. The motion conversion mechanism 10 converts a rotation position of the motor 9 into a position of the brake pad with respect to the brake disk. As the motion conversion mechanism 10, a ball screw or the like is utilized.

The controller 100a controls the electric brake 50a through the motor 9. As illustrated in FIG. 1, the controller 100a is provided with a rotation-position detection unit 101 (It can be called as a rotation-position detector 101.), an electric-brake control amount calculation unit 102a (It can be called as an electric-brake control amount calculator 102a.), and a motor control unit 103. (It can be called as a motor controller 103.) The controller 100a controls the electric brake 50a by performing switching between braking and non-braking, based on a pressing-force command value F_ref inputted from the outside.

Figure 2:
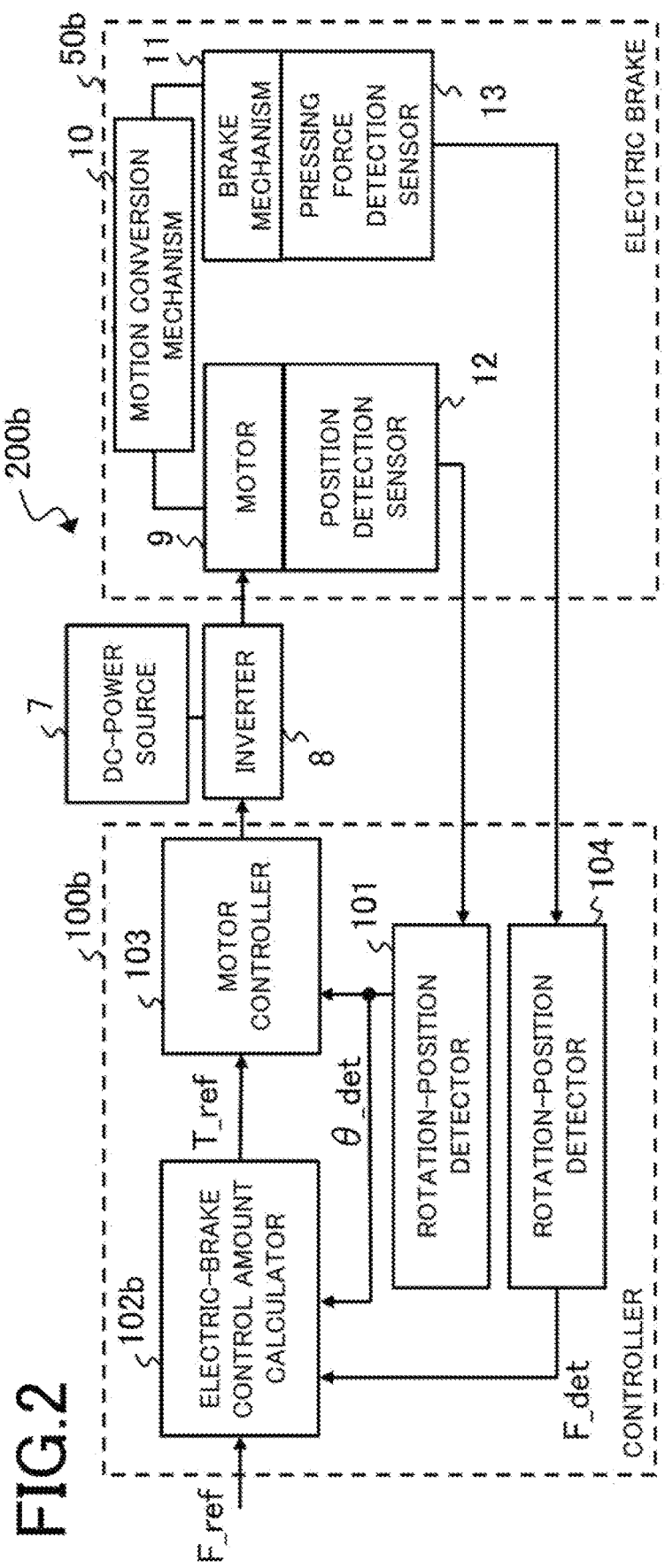
FIG. 2 is a configuration diagram of another example of the electric brake apparatus according to Embodiment 1.

FIG. 2 is a configuration diagram of another example of the electric brake apparatus according to Embodiment 1. An electric brake apparatus 200b includes an electric brake 50b, an electric-brake controller 100b (referred to only as a controller 100b, hereinafter), and the inverter 8. The electric brake 50b is different from the electric brake 50a, configured as represented in FIG. 1, in that it includes a pressing force detection sensor 13, as represented in FIG. 2. The pressing force detection sensor 13 detects the pressing force F produced in the brake mechanism 11. The controller 100b is provided with the rotation-position detection unit 101, a pressing force detection unit. 104, an electric-brake control amount calculation unit 102b, and the motor control unit 103. The controller 100b controls the electric brake 50b by performing switching between braking and non-braking, based on the pressing-force command value F_ref inputted from the outside.

Controller

Figure 3:
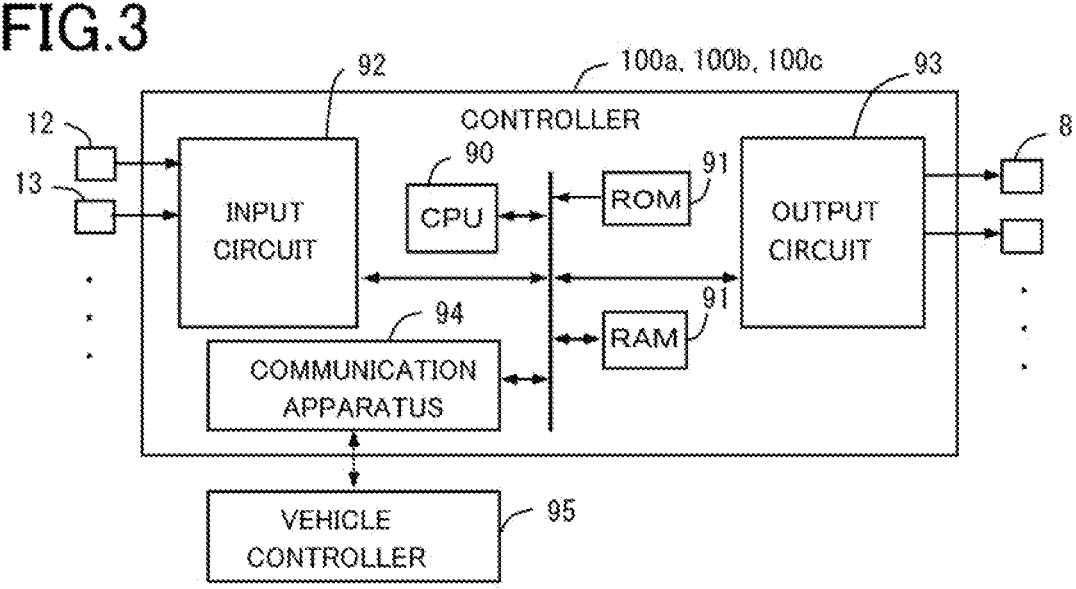
FIG. 3 is a hardware configuration diagram of an electric-brake control apparatus according to Embodiment 1.

The respective functions of the controllers 100a and 100b are realized by processing circuits provided in the apparatuses 100a and 100b. Specifically, as illustrated in FIG. 3, each of the controllers 100a and 100b includes, as processing; circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, a communication apparatus 94 that performs data communication with an external apparatus such as a vehicle controller 95, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are implemented in a sharing manner. As the storage apparatuses 91, there are provided a RAM (Random Access Memory) that can read data from and write data in the computing processing unit 90, a ROM (Read Only Memory) that can read data from the computing processing unit 90, and the like. The input circuit 92 is connected with input signals such as the pressing-force command value F_ref and the like, various kinds of sensors such as the position detection sensor 12 and the pressing force detection sensor 13, and switches and is provided with an A/D converter and the like for inputting these input signals and signals from the sensors and the switches to the computing processing unit 90. The output circuit 93 is connected with electric loads, for example, a gate driving circuit for on/off-driving the switching devices provided in the inverter 8, and is provided with a driving circuit and the like for outputting control signals from the computing processing unit 90 to these electric loads. The communication apparatus 94 performs communication with the external apparatus such as the vehicle controller 95.

The computing processing unit 90 runs software items (programs) stored in the storage apparatus 91 such as a ROM and collaborates with other hardware devices in the controller 100a, such as the storage apparatus 91, the input circuit 92, the output circuit 93, and the communication circuit 94, so that the respective functions of the function units 101, 102a, and 103 in FIG. 1, included in the controller 100a, are realized; in addition, the computing processing unit 90 runs software items stored in the storage apparatus 91 such as a ROM and collaborates with other hardware devices in the controller 100b, such as the storage apparatus 91, the input circuit 92, the output circuit 93, and the communication circuit 94, so that the respective functions of the function units 101, 102b, 103, and 104 in FIG. 2, included in the controller 100b, are realized. Respective setting data items to be utilized in the function units 101, 102a, 102b, and 104 are stored, as part of software items (programs), in the storage apparatus 91 such as a ROM. Hereinafter, the respective functions of the controllers 100a and 100b will be explained in detail.

<Rotation-Position Detection Unit>

As illustrated in each of FIGS. 1 and 2, the rotation-position detection unit 101 in each of the controllers 100a and 100b detects a rotation position θ (rotation angle, unrepresented) of the motor. In the present embodiment, the rotation-position detection unit 101 detects the rotation position θ, based on the output signal of the position detection sensor 12. Hereinafter, the detected rotation position θ will be referred to as a rotation-position detection value θ_det. The electric-brake control amount calculation units 102a and 102b can each calculate a position of the brake pad that is made to move by the motion conversion mechanism 10, by detecting the rotation angle of the motor. As a method of calculating the position of a brake pad, there exists a method in which the position thereof is calculated by directly detecting the moving amount of a brake pad through a contact-type sensor such as a potentiometer. In addition, there exists a method in which the position thereof is calculated by directly detecting the moving amount of a brake pad through a non-contact-type sensor such as a resolver, a hole device, or an encoder. The position of the brake pad may be calculated through any one of these methods.

<Pressing Force Detection Unit>

As illustrated in FIG. 2, the pressing force detection unit 104 in the controller 100b detects the pressing force F produced in the brake mechanism, based on an output signal of the pressing force detection sensor 13. Hereinafter, the detected pressing force will be referred to as a pressing-force detection value F_det.

<Electric-Brake Control Amount Calculation Unit>

Figure 4:
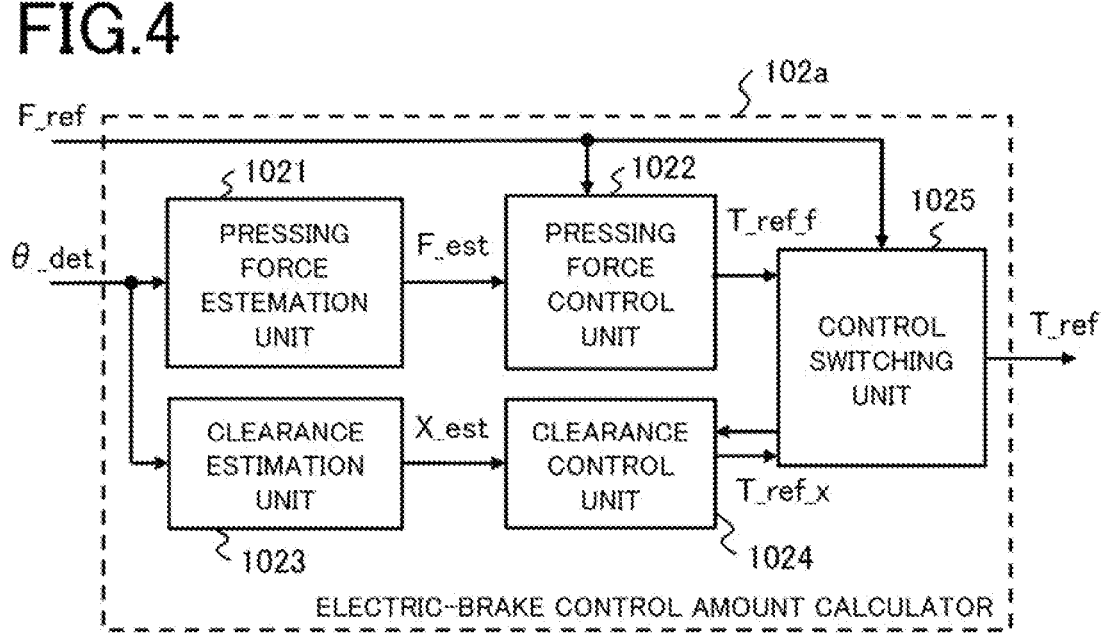
FIG. 4 is a configuration diagram of an electric-brake control amount calculation unit in the electric-brake control apparatus according to Embodiment 1.

FIG. 4 represents the configuration of the electric-brake control amount calculation unit. 102a in the configuration in FIG. 1. The electric-brake control amount calculation unit 102a has a pressing force estimation unit 1021, a pressing force control unit 1022, a clearance estimation unit 1023, a clearance control unit 1024, and a control switching unit 1025.

The pressing force estimation unit 1021 calculates a pressing-force estimation value F_est, based on the rotation-position detection value θ_det. The pressing force control unit 1022 calculates a control amount T_ref_f so that the pressing-force estimation value F_est approaches a pressing-force command value F_ref.

The clearance estimation unit 1023 calculates a clearance estimation value X_est between the brake pad and the brake disk in the brake mechanism. 11, based on the rotation-position detection value θ_det. Letting L denote a lead (a lead amount per rotation) in the motion conversion mechanism. 10, the clearance estimation value X_est can be calculated as in the equation (1) below. In the equation (1), θ_ofst is an offset for the rotation position (the unit of each of θ_det and θ_ofst is radian; L and θ_ofst are unrepresented).

$$X\_est = (\theta\_det - \theta\_ofst) \times L/(2\pi) \quad (1)$$

The clearance control unit 1024 calculates a control amount T_ref_x so that the clearance estimation value X_est approaches a clearance command value X_ref. In this situation, the clearance command value X_ref is a fixed value to be preliminarily set. In addition, the details of the calculation method for the control amount T_ref_x in the clearance control unit 1024 will be explained in the after-mentioned <Processing by Clearance Control Unit in Electric-Brake Control Amount Calculation Unit>.

Based on the pressing-force command value F_ref, the control switching unit 1025 selects any one of the control amount T_ref_f, which is the output of the pressing force control unit 1022, and the control amount T_ref_x, which is the output of the clearance control unit 1024, and then outputs the selected control amount, as a control amount T_ref. In the case where the pressing-force command value F_ref is larger than minute pressing force dF (dF is unrepresented), the control switching unit 1025 selects the control amount T_ref_f, which is the output of the pressing force control unit 1022, for performing braking; in all cases other than the above case, the control switching unit. 1025 selects the control amount T_ref_x, which is the output of the clearance control unit 1024, for performing no braking. In addition, it may be allowed that for switching the control items, the pressing-force estimation value F_est is utilized instead of the pressing-force command value F_ref. Moreover, there is no problem, of course, even if the minute pressing force dF is set to "0".

As described above, the electric-brake control amount calculation unit 102a has the clearance control unit 1024; in the case where the pressing-force command value is smaller than the minute pressing force dF, the clearance control unit 1024 outputs, as in the no-braking mode, the control amount T_ref_x for securing a clearance between the brake pad and the brake disk, based on a rotation position of the motor.

<Electric-Brake Control Amount Calculation Unit (Other Configuration Examples)>

Figure 5:
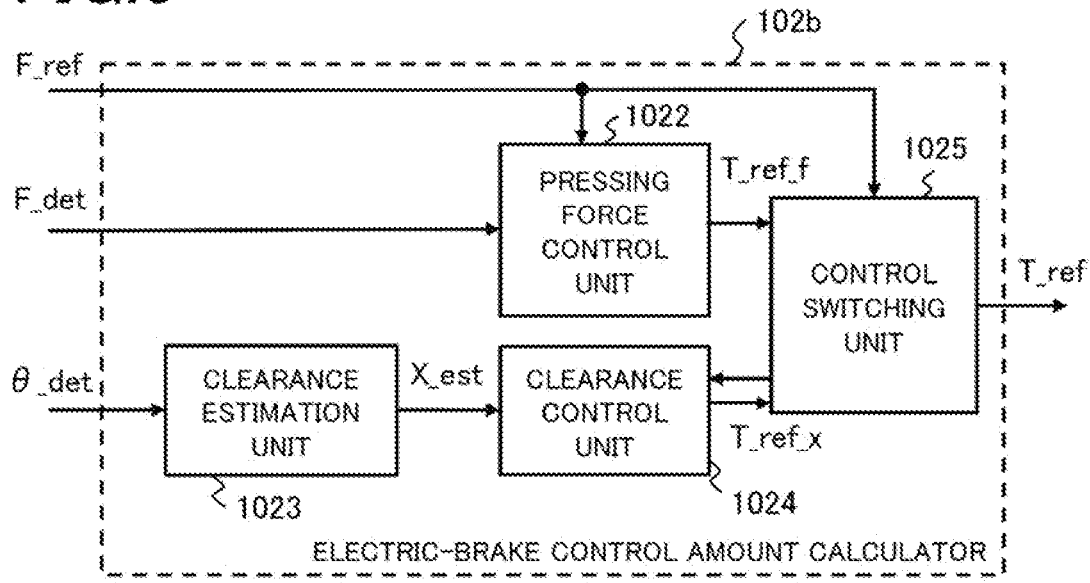
FIG. 5 is a configuration diagram of another example of the electric-brake control amount calculation unit in the electric-brake control apparatus according to Embodiment. 1.

FIG. 5 represents the configuration of the electric-brake control amount calculation unit 102b in the configuration in FIG. 2. The electric-brake control amount calculation unit 102b has the pressing force control unit 1022, the clearance estimation unit 1023, the clearance control unit 1024, and the control switching unit 1025. The pressing force control unit 1022 calculates a control amount T_ref_f so that the pressing-force detection value F_det approaches the pressing-force command value F_ref. The other calculations are the same as those in FIG. 4. In addition, it may be allowed that for switching the control items in the control switching unit 102S, the pressing-force detection value F_det is utilized instead of the pressing-force command value F_ref.

<Motor Control Unit>

The motor control unit 103 represented in each of FIGS. 1 and 2 controls the motor 9 by operating a current flowing in the motor 9, based on the control amount T_ref. For example, in the case where the motor 9 is a permanent-magnet synchronous motor, the control amount. T_ref becomes a torque command value or a q-axis-current command value; the two or more switching devices are turned on or off through current feedback control utilizing a vector control method, so that the winding current is controlled. Because the motor control unit 103 controls the winding current, output torque of the motor 9 is controlled; thus, the pressing force F produced in the brake mechanism 11 or a clearance X between the brake pad and the brake disk is controlled.

<Processing by Clearance Control Unit in Electric-Brake Control Amount Calculation Unit>

Figure 6:
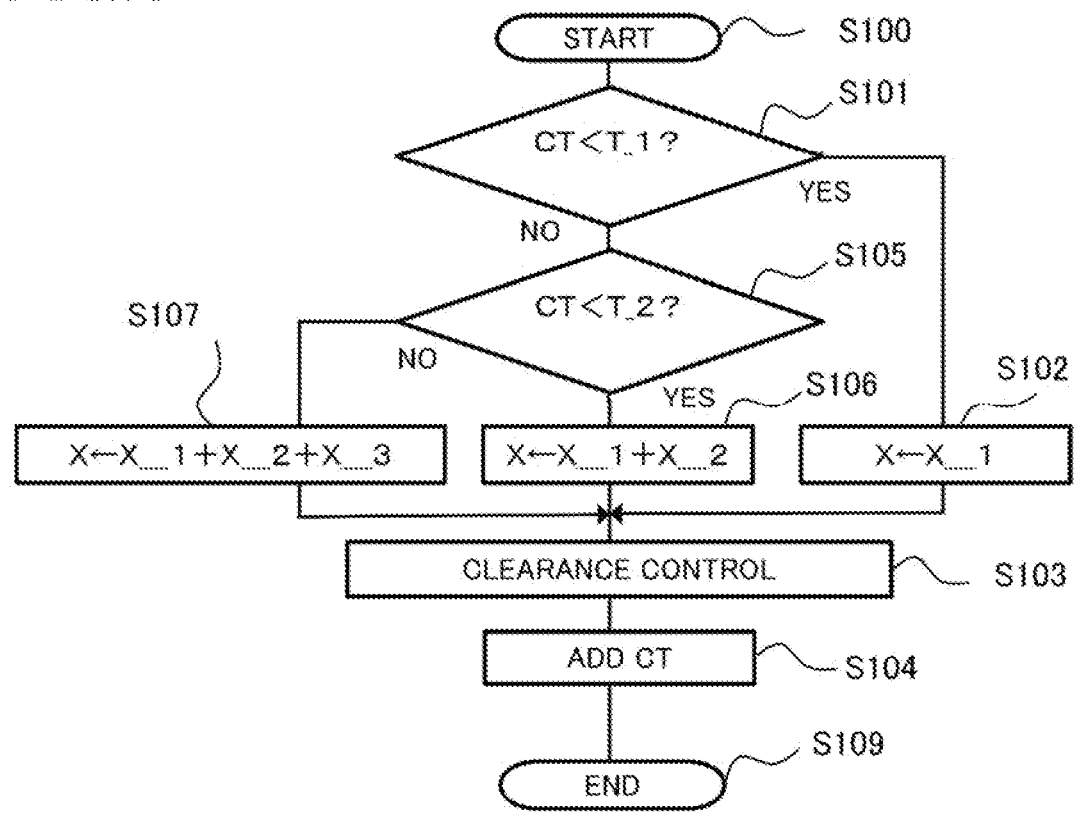
FIG. 6 is a flowchart representing processing by a clearance control unit of the electric-brake control amount calculation unit in the electric-brake control apparatus according to Embodiment 1.

Specific processing by each of the electric-brake control amount calculation units 102a and 102b according to the present embodiment will be explained. FIG. 6 is a flowchart for explaining processing by the clearance control unit 1024 in each of the electric-brake control amount calculation units 102a and 102b. It is assumed that the processing in the flowchart in FIG. 6 is performed every predetermined time (for example, every 1 ms). It may be allowed that the processing in the flowchart is started not every predetermined time but by an external signal such as a brake stepping-on signal or an obstacle detection signal. In that case, it may be allowed that the addition by the counter CT in the step S104 is performed every predetermined time in another place.

In the processing started from the step S100, it is determined in the step S101 whether or not the value of a counter CT is smaller than a first elapsed time T_1. When the control switching unit 102S switches a state (braking state) where the control amount T_ref_f, which is the output of the pressing force control unit 1022, is selected to a state (non-braking state) where the control amount T_ref_x, which is the output of the clearance control unit 1024, is selected, the counter CT is cleared; then, at that timing, the counter CT starts time measurement (unrepresented).

In the case where in the step S101, the value of the counter CT is smaller than the first elapsed time T_1 (in the case where the determination is "YES"), the clearance X is set to a first clearance value X_1 in the step S102; then, in the step S103, clearance control is performed. In the clearance control, the control amount T_ref_x is calculated so that the clearance approaches the clearance X. After that, addition processing is applied to the counter CT in the step S104; then, the processing is ended in the step S109.

In the case where in the step S101, the value of the counter CT is the same as or larger than the first elapsed time T_1 (in the case where the determination is "NO"), it is determined in the step S105 whether or not the value of the counter CT is smaller than a second elapsed time T_2, which is larger than the first elapsed time T_1. In the case where the value of the counter CT is smaller than the second elapsed time T_2 (in the case where the determination is "YES"), the clearance X is set to the sum of the first clearance value X_1 and the second clearance value X_2 in the step S106; then, in the step S103, the clearance control is performed.

In the case where in the step S105, the value of the counter CT is the same as or larger than the second elapsed time T_2 (in the case where the determination is "NO"), the step S105 is followed by the step S107, where the clearance X is set to the sum of the first clearance value X_1, the second clearance value X_2, and a third clearance value X_3; then, in the step S103, the clearance control is performed. The value of the clearance X at this time coincides with the clearance command value X_ref.

As described above, each of the controllers 100a and 100b according to Embodiment 1 is characterized in that the operation of making the clearance approach the clearance command value X_ref is performed in two or more separate steps. In FIG. 6, the example where the operation is performed in three separate steps has been explained; however, the operation may be performed in two or more than four separate steps.

Each of the respective operation items of the electric brakes 50a and 50b and the controllers 100a and 100b, which are configured in such a manner as describe above, will be explained by use of timing charts.

<Operation of Electric Brake Apparatus According to Comparative Example>

Figure 7:
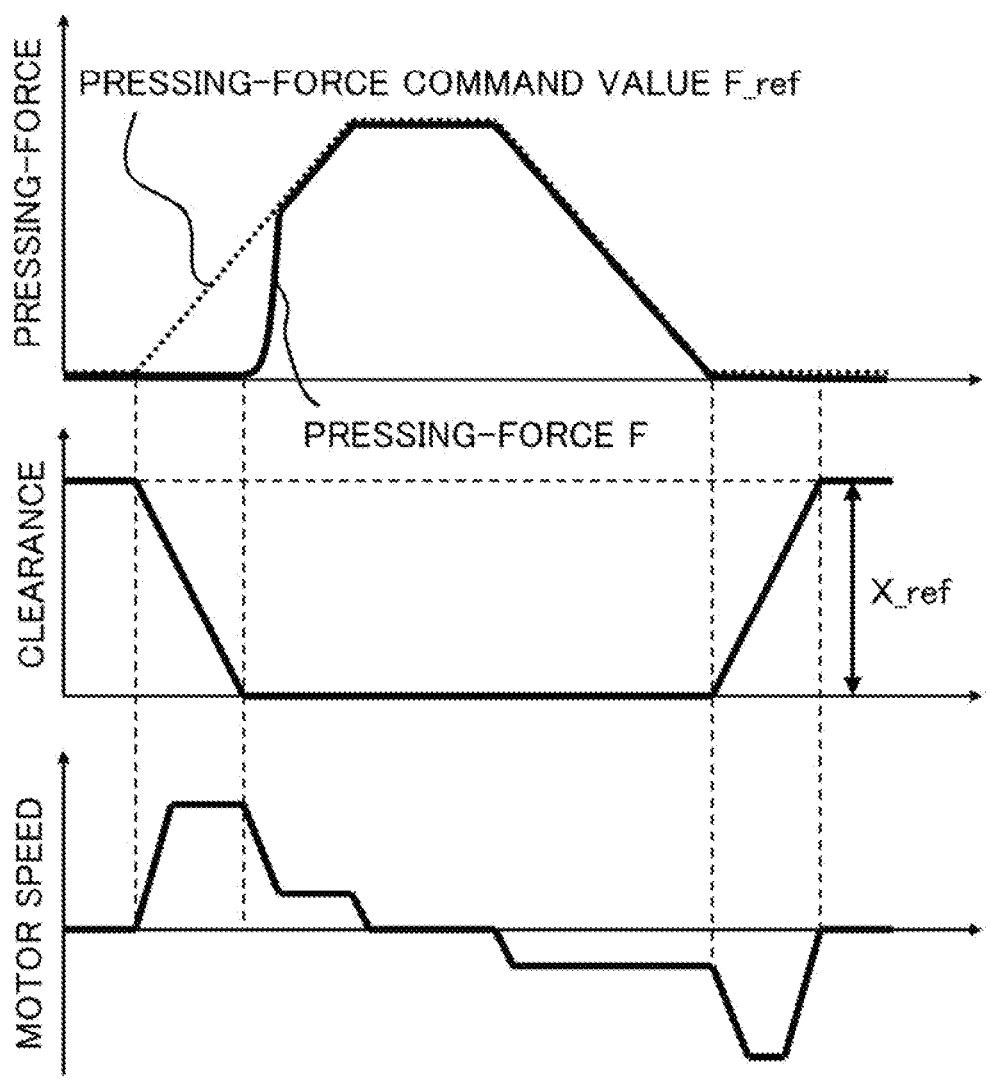
FIG. 7 is a first timing chart representing the operation of an electric brake apparatus according to a comparative example.

FIG. 7 is a first timing chart representing the operation of an electric brake apparatus according to a comparative example. The pressing-force command value F_ref gradually increases from "0" through one-time braking operation, generates braking force, and then gradually decreases to "0" again. When the operation is started, the brake mechanism 11 is in the non-braking state, the clearance command value X_ref is secured for the clearance X between the brake pad and the brake disk in the brake mechanism 11. In response to the positive pressing-force command value F_ref, braking is started; the motor rotates forward; then, the clearance X gradually decreases. After that, when the clearance X reaches "0", the brake pad and the brake disk make contact with each other so that the pressing force F is generated. Accordingly, generation of the pressing force F is delayed for the pressing-force command value F_ref. Next, as the pressing-force command value F_ref decreases, the motor rotates backward and the pressing force F gradually decreases. Then, after the pressing force F reaches "0", the brake mechanism 11 becomes non-braking-state and then stops while securing again the clearance X corresponding to the clearance command value X_ref.

Figure 8:
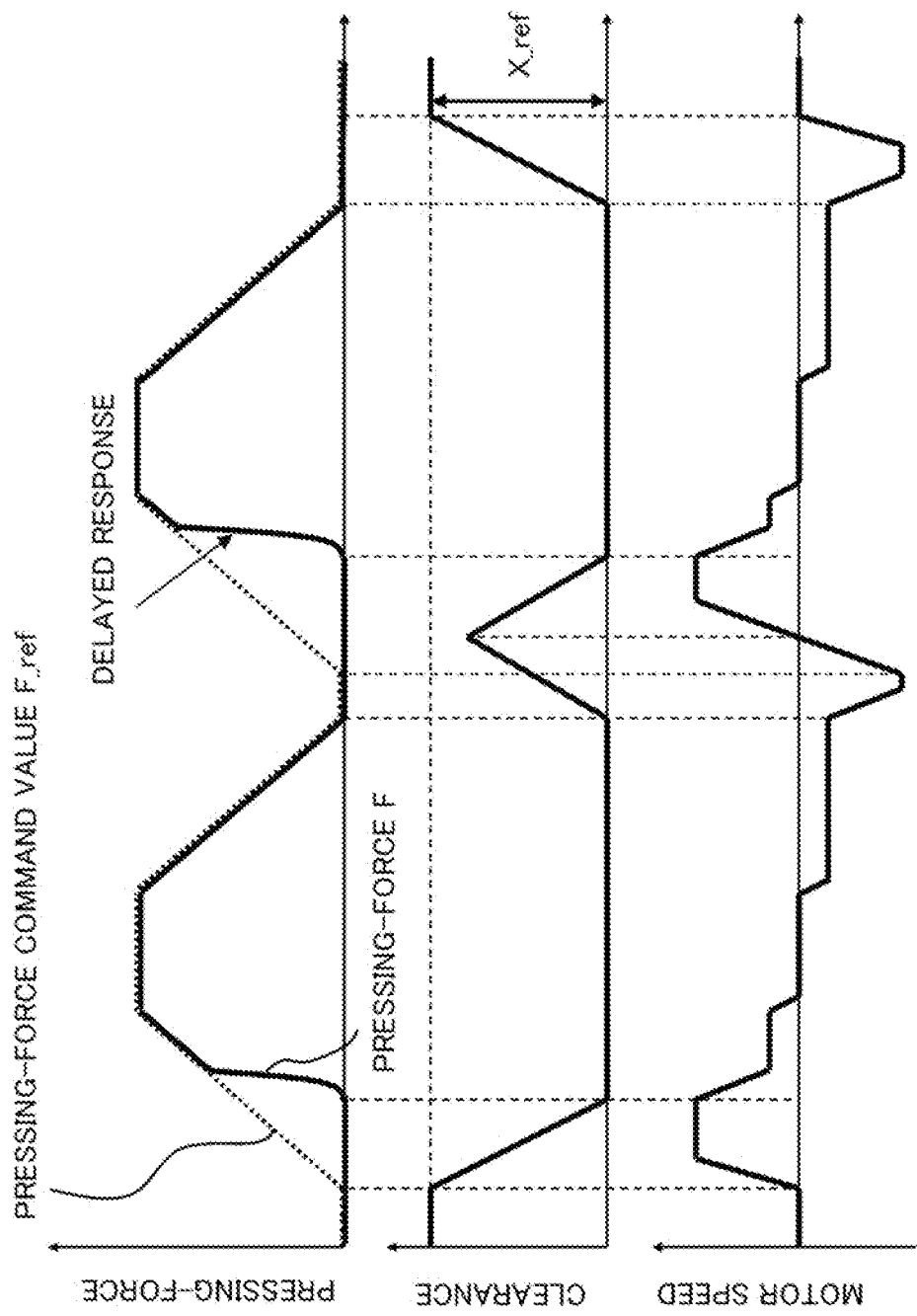
FIG. 8 is a second timing chart representing the operation of the electric brake apparatus according to the comparative example.

FIG. 8 is a second timing chart representing the operation of the electric brake apparatus according to the comparative example, when operated intermittently. As intermittent braking operation, there will be described a case where there are performed twice in series the operation in which the pressing-force command value F_ref gradually increases from "0", generates braking force, and then gradually decreases to "0" again. In this situation, immediately after the first pressing-force command value F_ref has become "0", the motor is continuing its backward rotation in order to secure a clearance. When during the change in this manner, the pressing-force command value F_ref increases again from "0", the motor reverses its rotation direction from backward rotation to forward rotation and then restarts the pressing operation. Accordingly, in comparison with the response of the pressing force F to the first pressing-force command value F_ref, the response of the pressing force F to the second pressing-force command value F_ref is delayed by a time corresponding to the time for reversing the rotation direction of the motor.

<Operation of Electric Brake Apparatus According to Embodiment 1>

Figure 9:
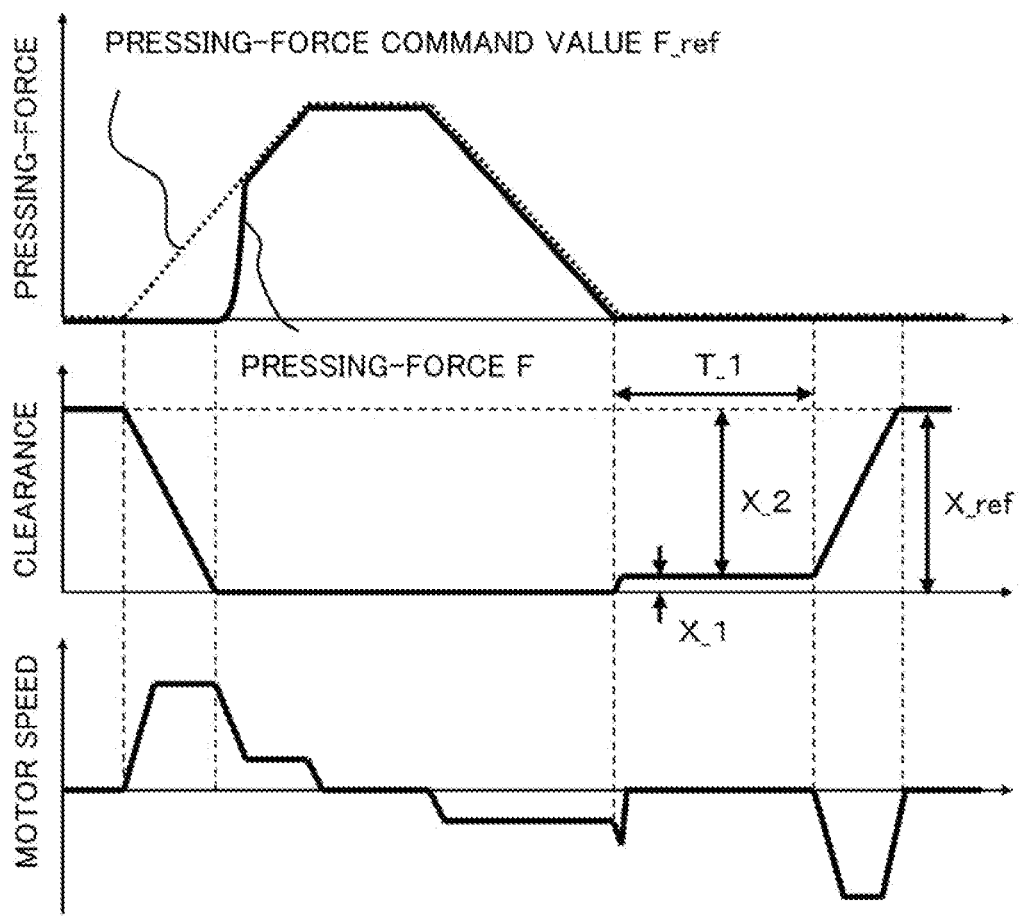
FIG. 9 is a first timing chart representing the operation of the electric brake apparatus according to Embodiment 1.

FIG. 9 is a first timing chart representing the operation of each of the electric brake apparatuses 200a and 200b according to Embodiment 1. The change in the pressing-force command value F_ref and the electric-brake operation from a time when braking force is generated to a time when the pressing-force command value F_ref becomes "0" again are the same as those in the operation of the comparative example in FIG. 7. In each of the controllers 100a and 100b according to Embodiment 1, reversal for securing a clearance after the pressing force F has reached "0" is performed in two or more separate steps (FIG. 9 represents an example in which the reversal is performed in two separate steps). In the first timing chart represented in FIG. 9, the first clearance change is X_1 and the second clearance change after the first elapsed time T_1 is X_2; the total clearance change is the clearance command value X_ref.

Figure 10:
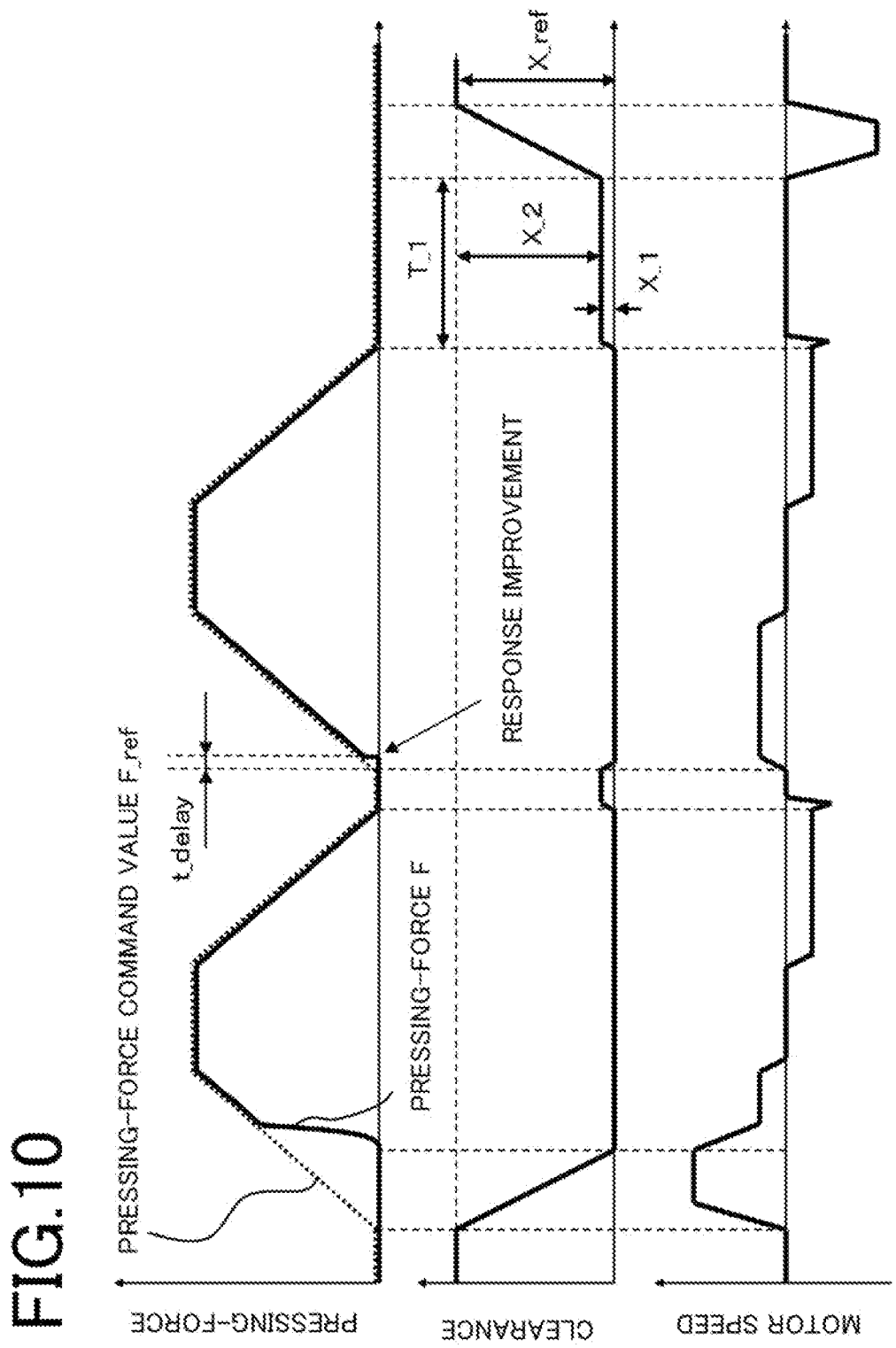
FIG. 10 is a second timing chart representing the operation of the electric brake apparatus according to Embodiment 1.

FIG. 10 is a second timing chart representing the operation of each of the electric brake apparatuses 200a and 200b according to Embodiment 1, when operated intermittently. The operation of the pressing-force command value F_ref and the electric-brake operation from a time when braking force is generated to a time when the braking force becomes "0" again in the case where the electric brake is intermittently operated are the same as those in FIG. 8. In each of the controllers 100a and 100b, reversal for securing a clearance after the pressing force F has reached "0" is performed in two or more separate steps. Accordingly, when the second pressing-force command value F_ref increases from "0", the brake pad is on standby with X_1, which is a clearance smaller than that in the example represented in FIG. 8. Thus, because the time for reversing the rotation direction of the motor and for changing the clearance is shortened, the pressing force F can rapidly be generated and hence the brake pad can be pressed to the brake disk. The response-delay time at this time is set to be within an allowable pressing delay time t_delay, which has been separately determined. The allowable pressing delay time t_delay is an allowable wasted time from a time when an input signal for starting braking is inputted to a time when the brake pad is pressed to the brake disk. In each of FIGS. 9 and 10, there has been described the example where the control amount for the clearance command value X_ref is changed in two separate steps; however, it may be allowed that the control amount is changed in three or more separate steps.

As described above, in the electric brake according to Embodiment. 1, the control of the motor 9 for making the clearance X at a time after the pressing force F has reached "0" coincide with the clearance command value X_ref is performed in two or more separate steps, so that the responsiveness of the pressing force F at a time when the brake is intermittently operated can be raised.

The first clearance value X_1 is more preferably set as follows. When the motor 9 having a characteristic of inertia J vs. motor torque T is rotated, a clearance changing amount X_t at a time t can be expressed as in the equation (2) below. "L" denotes a lead (a lead amount per rotation) in the motion conversion mechanism 10 (t, X_t, T, J, and L are unrepresented).

$$X\_t = (1/2) \times (T/J) \times t^2 \times L/(2\pi) \qquad (2)$$

A clearance changing time is a wasted time before the pressing force F is generated. Accordingly, as in the equation (3) below, the first clearance value X_1, which is the first clearance changing amount, is determined based on the allowable pressing delay time t_delay, so that the wasted time before the pressing force F is generated can be suppressed to be within the allowable pressing delay time t_delay. In the case where T, J, and L are fixed in the equation (3), the first clearance value X_1, which is the first clearance changing amount, becomes a function of the allowable pressing delay time t_delay. In the case where at least one of T, J, and L is changed, the other parameters are fixed; then, based on the allowable pressing delay time t_delay and the changed parameter, the first clearance value X_1, which is the first clearance changing amount, can be determined.

$$X\_1 = (1/2) \times (t/J) \times t\_delay^2 \times L/(2\pi) \qquad (3)$$

In addition, there has been described the operation in which the elapsed times T_1, T_2, and so on during which the clearance control unit 1024 of each of the electric-brake control amount calculation units 102a and 102b is on standby with the clearance values X_1, X_2, and so on, respectively, are preliminarily set times. However, it may be allowed that the elapsed times T_1, T_2, and so on are set in accordance with the traveling condition of a vehicle. That is to say, the time intervals with which the control amount for securing a clearance is changed in two or more separate steps are calculated based on the traveling condition of a vehicle.

For example, vehicle-speed information detected by a vehicle-speed detection means is inputted, as the traveling condition of a vehicle, to the controller 100a (100b) by way of the vehicle controller 95. There is established a configuration (unrepresented) in which vehicle-speed information is inputted, as the traveling condition of a vehicle, to the electric-brake control amount calculation unit 102a (102b). In the clearance control unit 1024 of the electric-brake control amount calculation unit 102a (102b), the elapsed times T_1, T_2, and so on at a time when the vehicle speed is higher than a predetermined determination vehicle speed are set to be shorter than those at a time when the vehicle speed is the same as or lower than the determination vehicle speed. Alternatively, setting is performed in such a way that as the vehicle speed increases, the elapsed times T_1, T_2, and so on are shortened. That is to say, the time intervals for which the control amount for securing a clearance is changed in two or more separate steps are shortened as the vehicle speed increases.

These characteristics make it possible that even in the case where when the brake pad is on standby with the clearance X=X_1, the brake pad and the brake disk make contact with each other to generate a drag resistance and hence deterioration of the gasoline mileage and overheating of the brake pad may be caused, the dragging time is set to be short in a high-vehicle-speed region where the effect of dragging is large. As described above, raising the responsiveness to a pressing-force command and suppressing the drag resistance can be implemented in a balanced manner. As far as the traveling condition of a vehicle, the elapsed times T_1, T_2, and so on may be changed in accordance with an acceleration of the vehicle, a road gradient (an ascent, a descent), or an engine load, instead of a vehicle speed. For example, because during acceleration, during travel on an ascendant road, or in the case where the engine load is large, the accelerator pedal is being stepped on and hence the case where the brake pedal is intermittently stepped on is rare, the elapsed times T_1, T_2, and so on can be set to respective shortened times.

<Another Example of Operation of Electric Brake Apparatus According to Embodiment 1>

Figure 11:
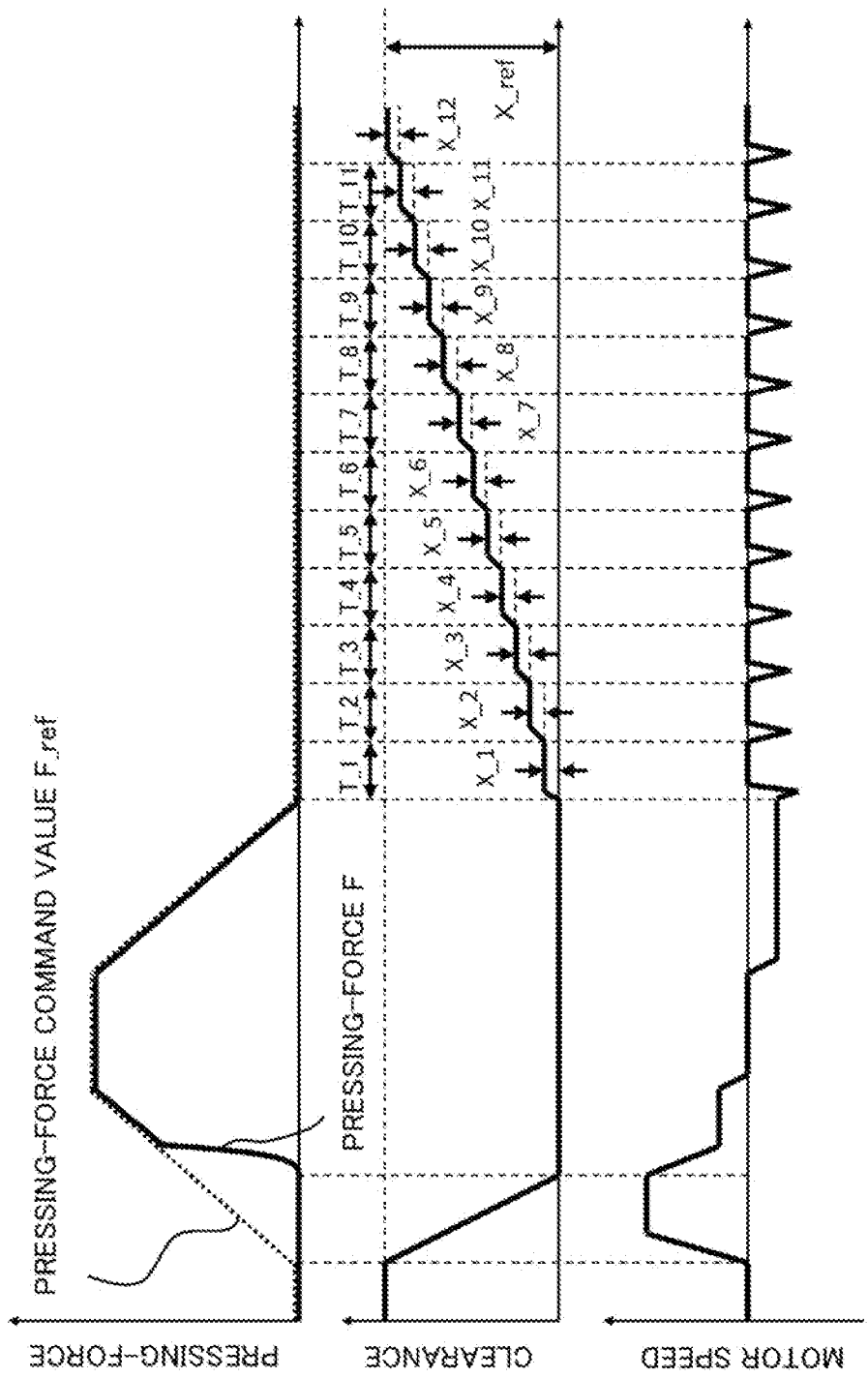
FIG. 11 is a third timing chart representing the operation of the electric brake apparatus according to Embodiment 1.

FIG. 11 is a third timing chart representing the operation of making the clearance of each of the electric brake apparatuses 200a and 200b according to Embodiment 1 approach the clearance command value X_ref, when the operation is performed in more minute separate steps. In the example of operation represented in FIG. 9, there has been described an example where the clearance command value X_ref is changed in two separate steps; however, the example of operation in FIG. 11 represents the case where the clearance command value X_ref is changed in 12 separate steps, which are more than those in the example in FIG. 9. In this situation, the n-th changing amount is described as X_n (unrepresented).

Figure 12:
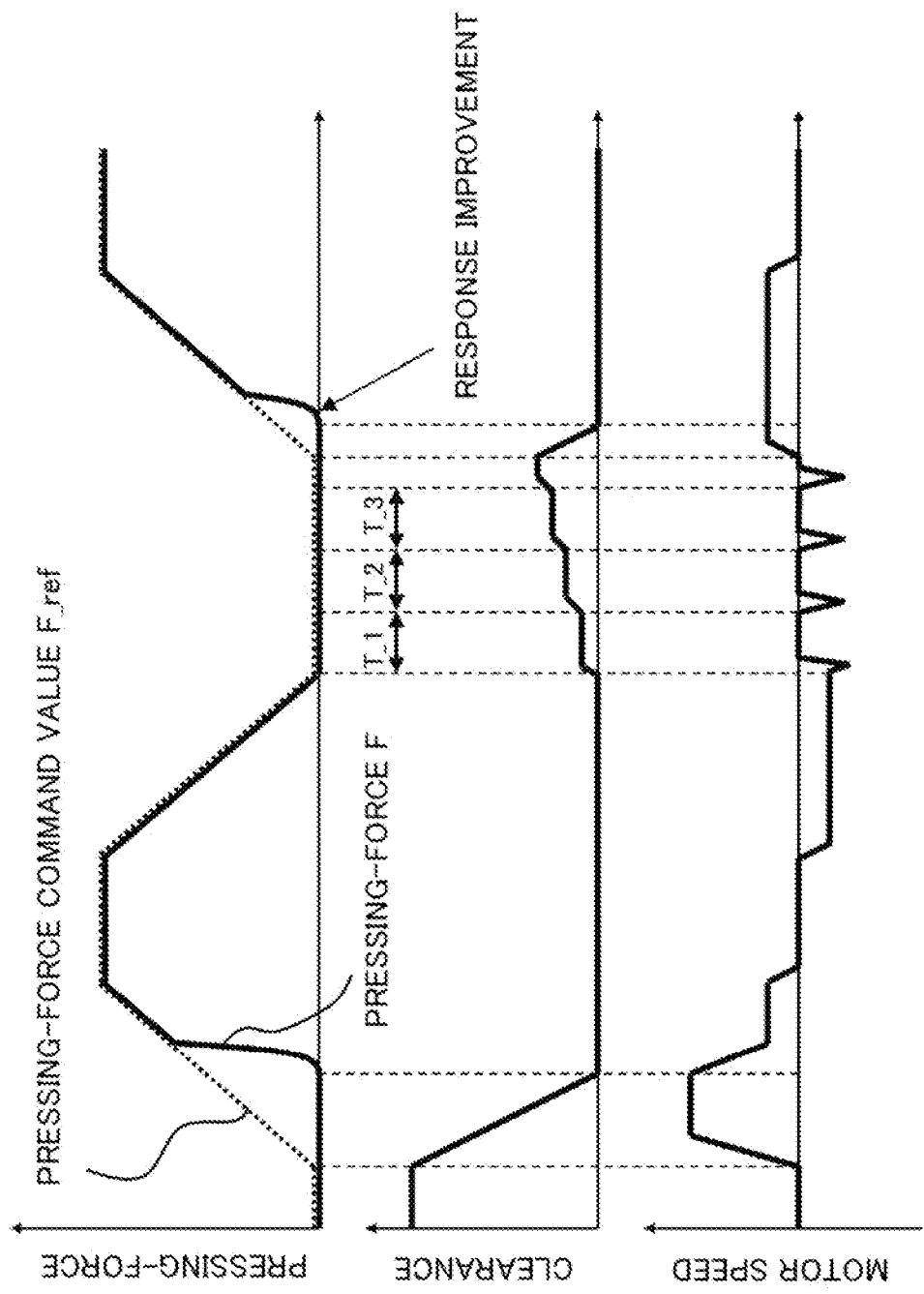
FIG. 12 is a fourth timing chart representing the operation of the electric brake apparatus according to Embodiment 1.

FIG. 12 represents the operation where in the case of FIG. 11, the electric brake of each of the electric brake apparatuses 200a and 200b is operated intermittently. In FIG. 12, in a setting example where the clearance is changed in 12 separate steps, the pressing-force command value F_ref is issued again after the fourth clearance change. In this situation, when the second pressing-force command value F_ref increases from "0", the controller is on standby with X_1+X_2+X_3+X_4, which is a clearance smaller than that in the example represented in FIG. 8. Thus, because the time for reversing the rotation direction of the motor and for changing the clearance is shortened, the pressing force F can rapidly be generated.

The state where the controller is on standby with the clearance X=X_1 is advantageous in that the responsiveness to the pressing-force command is rapid; however, there exists probability that the brake pad and the brake disk make contact with each other thereby causing a drag resistance and hence the gasoline mileage decreases. In contrast, in the operation in each of FIGS. 11 and 12, the clearance is changed in two or more separate steps so as to gradually change in such a way as to be X_1, X_2, X_3, and so on; thus, raising the responsiveness to a pressing-force command and suppressing the drag resistance can be implemented in a balanced manner.

In the case where all of n clearance changes are set to one and the same value, letting the allowable pressing delay time t_delay denotes a wasted time before the pressing force F is generated, each clearance changing amount X_n may be determined as in the equation (4) below (X_n, n are unrepresented).

$$X\_n=(1/2)\times(T/J)\times t\_delay^2\times L/(2\pi) \quad (4)$$

In this case, by use of the clearance changing amount X_n and the clearance command value X_ref, the division number n for the clearance change can be determined as in the equation (5) below. In this situation, the division number n for the clearance change can be specified as a function of the allowable pressing delay time t_delay. In the case where at least one of T, J, and L is changed, the other parameters are fixed; then, based on the allowable pressing delay time t_delay and the changed parameter, the division number can be calculated.

$$n=X\_ref/X\_n \quad (5)$$

2. Embodiment 2

Figure 13:
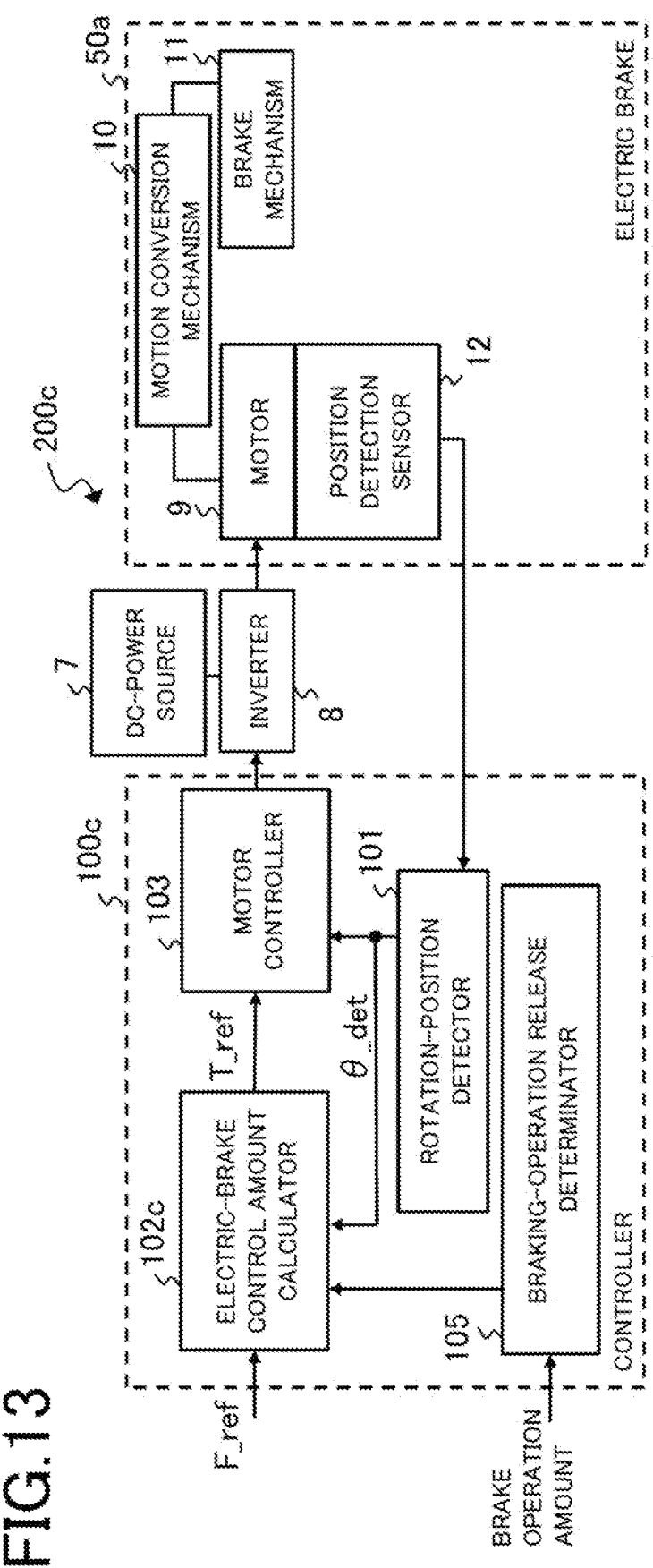
FIG. 13 is a configuration diagram of an electric brake apparatus according to Embodiment 2.

An electric-brake controller 100c (referred to simply as a controller 100c) according to Embodiment 2 will be explained. FIG. 13 is a configuration diagram of an electric brake apparatus 200c according to Embodiment 2. The electric brake apparatus 200c includes the electric brake 50a, the controller 100c, and the inverter 8. The basic configuration of the controller 100c is the same as that of each of the controllers 100a and 100b according to Embodiment 1; therefore, the explanation therefor will be omitted. Embodiment 2 is different from Embodiment 1 in that a braking-operation release determination unit 105 is provided therein. (It can be called as a braking-operation release determinator 105.)

Based on a brake operation amount, the braking-operation release determination unit 105 determines whether or not a driver has released brake-pedal operation. A brake operation amount, which is obtained by detecting brake-pedal operation by a driver by use of a stroke sensor, is inputted to the controller 100c by way of the vehicle controller 95 (unrepresented in FIG. 13). In the case where the state where the brake operation amount is "zero" continues for a predetermined waiting time, the braking-operation release determination unit 105 determines that the driver has released braking operation, makes an operation release flag f_rb ON, and then outputs it. In the case where before the operation release flag f_rb becomes ON, the brake is newly operated and a positive pressing-force command value F_ref is issued, the operation release flag f_rb remains to be OFF (f_rb is unrepresented).

The configuration of the electric-brake control amount calculation unit 102c is almost the same as the configuration explained in FIG. 4; the difference therebetween is that the operation release flag f_rb from the braking-operation release determination unit 105 is inputted to the electric-brake control amount calculation unit 102c. The clearance control unit 1024 in the electric-brake control amount calculation unit 102c calculates the control amount T_ref_x so that the clearance estimation value X_est approaches the clearance command value X_ref. In this situation, the clearance command value X_ref is a fixed value to be preliminarily set. In addition, the details of the calculation method for the control amount T_ref_x in the clearance control unit 1024 will be explained in the after-mentioned <Processing by Clearance Control Unit in Electric-Brake Control Amount Calculation Unit>.

<Processing by Clearance Control Unit in Electric-Brake Control Amount Calculation Unit>

Figure 14:
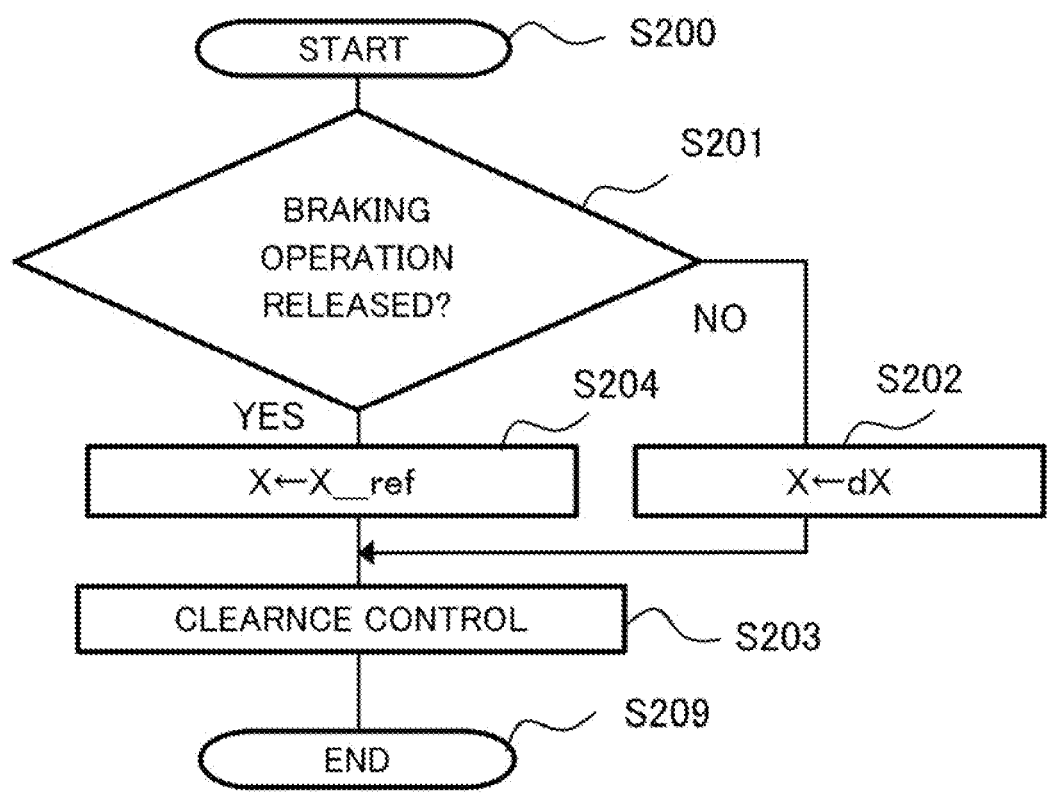
FIG. 14 is a flowchart representing processing by a clearance control unit of an electric-brake control amount calculation unit in an electric-brake control apparatus according to Embodiment 2.

Specific processing by the electric-brake control amount calculation unit 102c according to Embodiment 2 will be explained. FIG. 14 is a flowchart for explaining processing by the clearance control unit 1024 in the electric-brake control amount calculation units 102c. It is assumed that the processing in the flowchart in FIG. 14 is performed every predetermined time (for example, every 1 ms). It may be allowed that the processing in the flowchart is started not every predetermined time but by an external signal such as a brake stepping-on signal or an obstacle detection signal.

In the processing started from the step S200, it is determined in the step S201 whether or not braking operation has been released. The foregoing determination is performed based on whether or not the operation release flag f_rb is ON. When the braking operation has not been released (the determination is "NO"), the clearance X is set to a predetermined minute value dX in the step S202; then, in the step S203, the clearance control is performed. In the clearance control, the control amount. T_ref_x is calculated so that the clearance approaches the clearance X. After that, the processing is ended in the step S209. In addition, there is no problem, even if the predetermined minute value dX is set to "0".

When in the step S201, the braking operation has been released (the determination is "YES"), the clearance X is set to the clearance command value X_ref in the step S204; then, in the step S203, the clearance control is performed. The clearance command value X_ref is a fixed value to be preliminarily set and is a sufficient clearance between the brake pad and the brake disk, with which the brake causes no dragging.

<Operation of Electric Brake Apparatus According to Embodiment 2>

Figure 15:
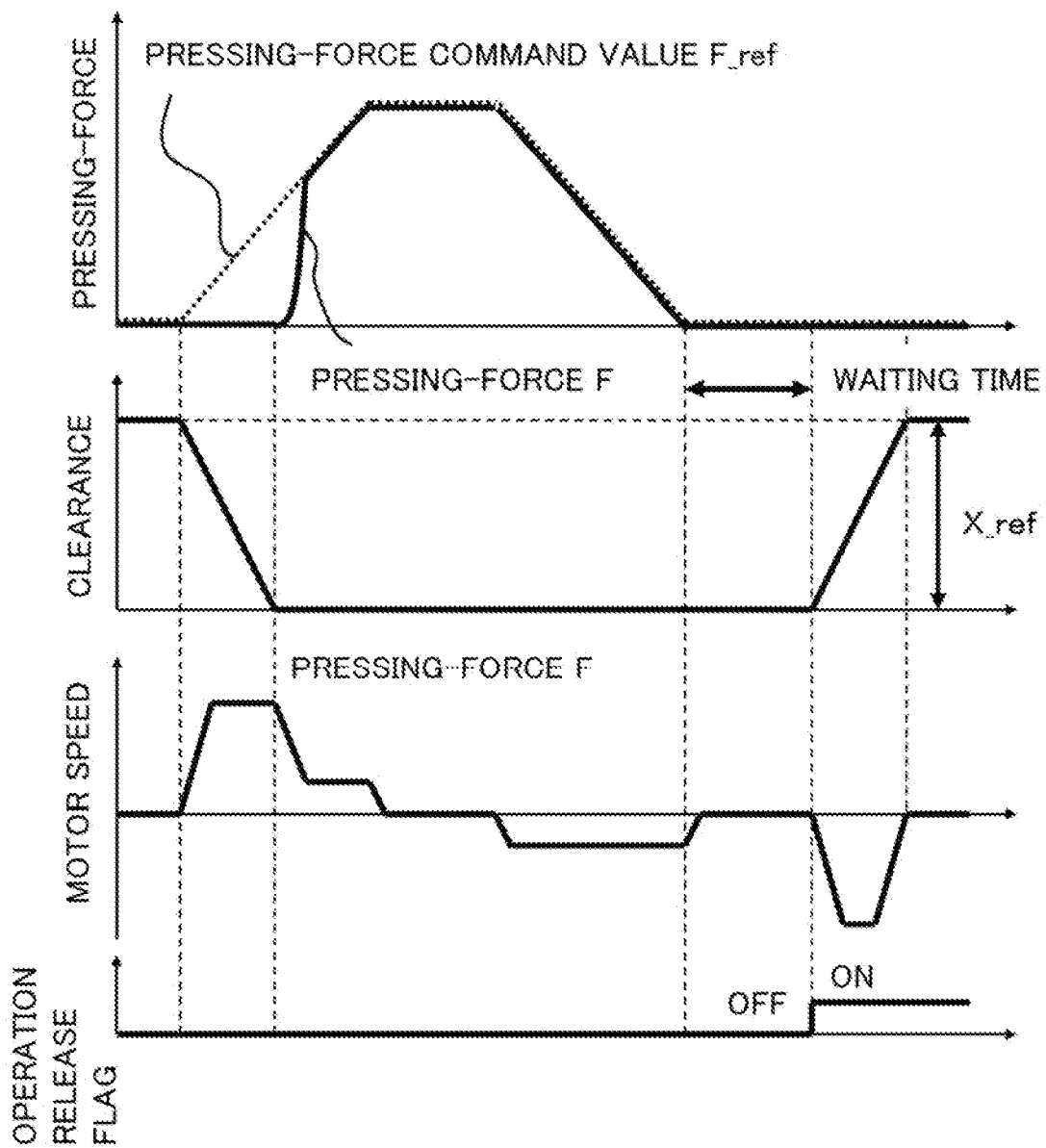
FIG. 15 is a first timing chart representing the operation of the electric brake apparatus according to Embodiment 2.

FIG. 15 is a first timing chart representing the operation of the electric brake apparatus 200c according to Embodiment 2. The operation of the pressing-force command value F_ref and the electric-brake operation from a time when braking force is generated to a time when the braking force becomes "0" again are the same as those in each of FIGS. 7, 9, and 11. by the controller 100c Embodiment 2, after the pressing force F has reached "0", the brake pad is stopped at a position where the clearance is the minute value dX. Then, in the case where the state where the brake operation amount is "zero" continues for a predetermined waiting time, the braking-operation release determination unit 105 determines that the driver has released braking operation, makes the operation release flag ON, and then outputs it; when receiving the operation release flag (ON), the electric-brake control amount calculation unit 102c performs control that the clearance becomes the clearance command value X_ref. The braking-operation release determination unit 105 is provided in such a manner as described above, so that a waiting time is provided before a clearance is secured.

FIG. 16 is a second timing chart representing the operation of the electric brake apparatus 200c according to Embodiment 2, when operated intermittently. In the case where the electric brake is operated, the electric-brake operation from a time when the pressing-force command value F_ref rises so as to generate braking force to a time when the pressing-force command value F_ref becomes "0" again is the same as that in FIG. 8. When the pressing force F reaches "zero", the controller 100c according to Embodiment 2 waits for a predetermined waiting time until the braking-operation release determination unit. 105 determines that the braking operation has been released and then makes the operation release flag ON, and then secures a clearance. Accordingly, because when the second pressing-force command value F_ref increases from "0" before the waiting time elapses, the controller 100c is waiting with the clearance of the minute value dX, it is made possible that the pressing force F is generated more rapidly than in the example in FIG. 8.

As described above, in the electric brake according to Embodiment. 2, after the pressing force F has reached "0", the controller 100c waits with the clearance of the minute value dX until the waiting time in which it is determined that the driver has released braking operation elapses; thus, the responsiveness of the second pressing force F at a time when the brake is intermittently operated can be raised.

In addition, in Embodiment 2, the braking-operation release determination unit 105 is configured in such a way as to determine that a driver has released brake-pedal operation, based on a brake operation amount inputted to the controller 100c; however, the method of determining that brake-pedal operation has been released is not limited thereto. For example, it may be allowed that the braking-operation release determination unit 105 is configured in such a way as to determine that brake-pedal operation has been released, when a state where the pressing-force command value F_ref is inputted and is "zero" continues for a specific time.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

What is claimed is:

1. An electric-brake controller for controlling an electric brake in which a brake pad is pressed to a brake disk by converting rotary motion of a motor into linear motion, the electric-brake controller comprising:
   a position calculator that calculates a position of the brake pad;
   an electric-brake control amount calculator that performs switching between braking and non-braking in accordance with an input signal and calculates a brake control amount with braking and a plurality of clearance control amounts with non-braking for the electric brake; and
   a motor controller that controls the motor, based on the brake control amount with braking and the clearance control amount with non-braking,
   wherein the braking comprises a first state in which the input signal indicates that the brake pad is to be pressed to the brake disk,
   wherein the non-braking comprises a second state in which the input signal indicates that the brake pad is not to be pressed to the brake disk,
   wherein, based on determining that the braking is switched to the non-braking and without switching back from the non-braking to the braking, the electric-brake control amount calculator:
      calculates a first clearance control amount, of the plurality of clearance control amounts, for securing a first portion of a predetermined clearance between the brake pad and the brake disk, based on a position of the brake pad, calculated by the position calculator at a non-braking time, and secures the first portion of the predetermined clearance by controlling the motor to move the brake pad away from the brake disk according to the first clearance control amount, the first portion is indicated by the first clearance control amount and is less than the predetermined clearance,
      calculates, in response to determining that an interval of time has passed since the motor has been controlled to move the brake pad away from the brake disk according to the first clearance amount and without the non-braking being switched to the braking, a second clearance control amount, of the plurality of clearance control amounts, for securing a second portion of the predetermined clearance between the brake pad and the brake disk, and secures the second portion of the predetermined clearance by controlling the motor to move the brake pad further away from the brake disk than the first portion of the predetermined clearance and according to the second clearance control amount, the second portion is indicated by the second clearance control amount and is both greater than the first portion and is either less than or equal to the predetermined clearance,
   wherein during an interval of time since the motor has been controlled to move the brake pad away from the brake disk according to the first clearance control amount, a distance between the brake pad and the brake disk is held constant.

2. The electric-brake controller according to claim 1, wherein the position calculator calculates a position of the brake pad, based on a rotation position of the motor, detected by a rotation-position detector.

3. The electric-brake controller according to claim 1,
the electric-brake control amount calculator calculates the first clearance control amount based on a predetermined allowable pressing delay time, and
wherein the allowable pressing delay time is an allowable wasted time from a time when the input signal indicates a starting of the braking to a time when the brake pad is pressed to the brake disk.

4. The electric-brake controller according to claim 3, wherein the electric-brake control amount calculator calculates the first clearance control amount, based on the allowable pressing delay time and at least one of maximum torque of the motor, inertia of the motor, and a lead amount per rotation of a motion conversion mechanism for converting rotary motion of the motor into linear motion.

5. The electric-brake controller according to claim 1, wherein based on a predetermined allowable pressing delay time, the electric-brake control amount calculator calculates a number of times when portions, including the first portion and the second portion, of the predetermined clearance is secured.

6. The electric-brake controller according to claim 5, wherein the electric-brake control amount calculator calculates the number of times, based on the allowable pressing delay time and at least one of maximum torque of the motor, inertia of the motor, and a lead amount per rotation of the motion conversion mechanism for converting rotary motion of the motor into linear motion.

7. The electric-brake controller according to claim 1, further comprising a traveling condition detector that detects a traveling condition of a vehicle, wherein based on the traveling condition, the electric-brake control amount calculator calculates the interval.

8. The electric-brake controller according to claim 7,
wherein the traveling condition detector detects a vehicle speed, and
wherein the electric-brake control amount calculator shortens the interval as the vehicle speed increases.

9. The electric-brake controller according to claim 1, further comprising a braking-operation release determinator that determines whether or not a driver has released brake-pedal operation, based on a brake operation amount,
wherein in a case where the braking-operation release determinator determines that the brake-pedal operation has been released, the electric-brake control amount calculator calculates a first clearance between the brake pad and the brake disk, and
wherein in a case where the braking-operation release determinator does not determine that the brake-pedal operation has been released, the electric-brake control amount calculator calculates a second clearance that is smaller than the first clearance.

10. The electric-brake controller according to claim 9, wherein in the case where a state where the brake operation amount is zero continues for a predetermined waiting time, the braking-operation release determinator determines that a driver has released brake-pedal operation.

11. The electric-brake controller according to claim 1,
wherein during a minority of the interval of time since the motor has been controlled to move the brake pad away from the brake disk according to the first clearance control amount, the distance between the brake pad and the brake disk is increased, and
wherein during a majority of the interval of time since the motor has been controlled to move the brake pad away from the brake disk according to the first clearance control amount, the distance between the brake pad and the brake disk is held constant.

12. The electric-brake controller according to claim 1,
wherein the brake pad is not yet pressed to the brake disk during an initial part of the braking.

* * * * *